United States Patent [19]
Brownrigg et al.

[11] Patent Number: 5,100,230
[45] Date of Patent: Mar. 31, 1992

[54] TRUE GROUND SPEED SENSOR

[75] Inventors: Patrick C. Brownrigg, Long Beach; David B. Chang, Tustin; Victor Vali, Laguna Hills, all of Calif.

[73] Assignee: Hughes Aircraft Company, Los Angeles, Calif.

[21] Appl. No.: 597,953

[22] Filed: Oct. 12, 1990

[51] Int. Cl.$^5$ .................... G01P 3/36; G01B 9/02
[52] U.S. Cl. .................... 356/28; 356/349; 356/354
[58] Field of Search ............... 356/28, 28.5, 349, 354; 250/237 G, 550

[56] References Cited

U.S. PATENT DOCUMENTS

| | | | |
|---|---|---|---|
| 3,432,237 | 3/1969 | Flower et al. | 356/28 |
| 3,525,569 | 8/1970 | Gamertsfelder et al. | 356/28 |
| 3,820,896 | 6/1974 | Stavis | 356/28 |
| 3,960,410 | 6/1976 | Leitz et al. | 356/28 |
| 4,961,643 | 10/1990 | Sakai et al. | 356/28 |

OTHER PUBLICATIONS

"Interferometry", W. H. Steel, Second Edition, Cambridge University Press, 1983, pp. 57–58.
"Optical Frequency Shifting by Means of a Rotating Diffraction Grating," W. H. Stevenson, Applied Optics, vol. 9, No. 3, Mar. 1970, pp. 649–652.

Primary Examiner—Stephen C. Buczinski
Attorney, Agent, or Firm—Michael W. Sales; Wanda K. Denson-Low

[57] ABSTRACT

A speed sensor for a moving vehicle. A transmissive grating is used in conjunction with an electromagnetic wave source and beam combining waveguide to mix two beams of frequency f and f+Δf, where Δf is proportional to the speed of the grating relative to the ground. The source energy is reflected off the road to the grating. The zeroth and first order transmission from the grating are mixed to give the beat frequency Δf proportional to the ground speed. The sensor has no moving parts, and is independent of any gear ratios.

17 Claims, 1 Drawing Sheet

TRUE GROUND SPEED SENSOR

BACKGROUND OF THE INVENTION

The present invention relate to the field of ground speed sensor apparatus, and more particularly to such apparatus for measuring the true ground speed of moving vehicles.

Conventional speedometers pick off the vehicle speed assuming a constant gear ratio from the tire to axle to drive train. If the tire(s) pressure becomes low, or if tires are installed which are larger or smaller in diameter than the original equipment tire size, then the gear ratio, and hence the calibration of the speedometer, changes.

It would therefore represent an advance in the art to provide a ground speed measuring apparatus which is independent of height of the car from the road and any gear ratios.

It would further represent an advance in the art to provide a ground speed sensor for moving vehicles which is compact, has no moving parts, and is rugged.

SUMMARY OF THE INVENTION

A ground speed sensor for moving vehicles is described, and comprises a source of electromagnetic energy arranged to generate a beam of energy downwardly toward the ground adjacent or underneath the vehicle.

A diffraction grating is arranged adjacent the vehicle undercarriage so that electromagnetic energy reflected from the ground is incident on the grating, which diffracts the beam into a plurality of beams.

The sensor further includes means for combining the energy diffracted by the grating to develop an energy beat frequency which is dependent on the speed of the grating relative to the ground. Means responsive to the energy beat frequency provides a sensor signal indicative of the speed of the vehicle relative to the ground.

In a preferred embodiment, the energy combining means includes means for combining the zero order and first order diffracted energy beams from the grating. The beat frequency is the difference between the frequency of the zero order beam and the frequency of the first order diffracted beam.

The source of electromagnetic energy may comprise a source of infrared electromagnetic energy such as a semiconductor infrared laser. Alternatively, the source can be an optical light source or an RF energy source.

The sensor grating is characterized by a grating having a number of slits of width b, wherein the beat frequency is substantially equal to v/b, where v represents the speed of the vehicle relative to the ground.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

It has been shown that optical frequency shifts can be produced in various diffraction orders of a linear grating moving in a direction perpendicular to the rulings. See, e.g. "Interferometry," W.H. Steel, Second Edition, Cambridge University Press, 1983, pages 57-58; "Optical Frequency Shifting by Means of a Rotating Diffraction Grating," W. H. Stevenson, APPLIED OPTICS, Vol. 9, No. 3, March 1970, pages 649-652.

Figure 1:
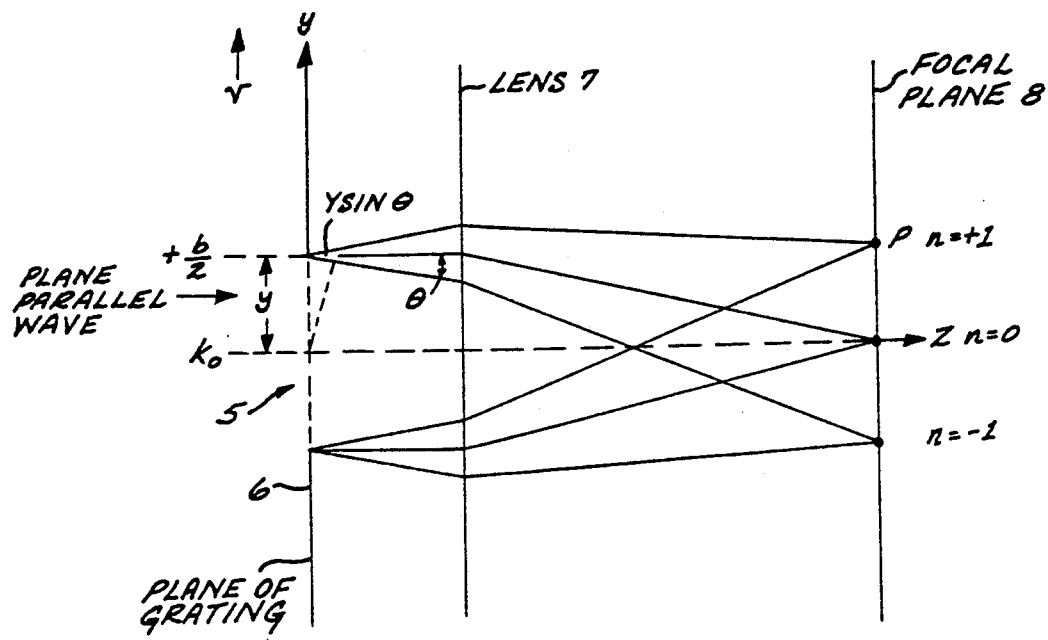
FIG. 1 illustrates the principle of optical frequency shifts for a linear grating slit illuminated by a source.

Consider the case of Fraunhoffer type diffraction by a single slit of width b and length L. (It is simpler to start with describing the field for one slit. To generalize for a grating (multiple slits equally spaced), the field is summed over N, the total number of slits illuminated by the source.) FIG. 1 illustrates the geometry. A plane parallel wave of frequency $w_0$ is incident on a slit 5 formed in a grating 6, where the slit edges diffract the incident beam through the angle $\theta$. A lens 7 converges the diffracted beams at a lens focal plane 8. The distribution of the field at point P is given by the Fresnel-Kirchoff formula, $$U_p = C \int\int e^{ik_o r} dx dy e^{iw_o t} \quad (1)$$

where C is a constant, $dxdy = Ldy$, $w_o = 2\pi f$, $\theta = n(\lambda/b)$, $k_o = 2\pi/\lambda_o$, r is the distance from the slit edge to the focal plane illustrated in FIG. 1, and $n = 0, \pm 1, \pm 2$. For the slit moving with velocity v, r can be expressed as $$r = r_o + (y + vt)\sin\theta, \quad (2)$$

where $r_o$ is the value of r for $y = 0$. The integral for $U_p$ reduces to $$U_p = C\, e^{ikr_o}\, e^{i(kvt\sin\theta + wt)} \int_{-b/2}^{b/2} e^{iky\sin\theta} L dy \quad (3)$$

$$= C L e^{ikr_o} e^{i(kvt\sin\theta + wt)} ((\sin\beta)/\beta), \quad (4)$$

where $\beta = (\frac{1}{2})kb\sin\theta$. The frequency shift $\Delta f$ due to the moving slit is $$\Delta f = (kv/2\pi)\sin\theta. \quad (5)$$

For $\theta = n(\lambda/b) << 1$, $\sin\theta \approx \theta$ and $\Delta f = n(v/b)$.

Since $\Delta f = 0$ for $n = 0$ (zero-th order, the non-diffracted beam), the zero-th order and first order ($n = \pm 1$) diffracted beams are combined in accordance with this invention. The beams interfere with one another to produce a beat frequency $\Delta f$. The beat frequency provides a value for the speed v.

Diffracted beams other than the $n = 0$ and $n = \pm 1$ can be combined to produce a beat frequency other than $\Delta f$. For example, the $n = +2$ order beam can be combined with any of the $n = \pm 1, -2, \pm 3, \ldots$ order beam to produce a beat frequency that is an integer multiple of $\Delta f$.

Figure 2:
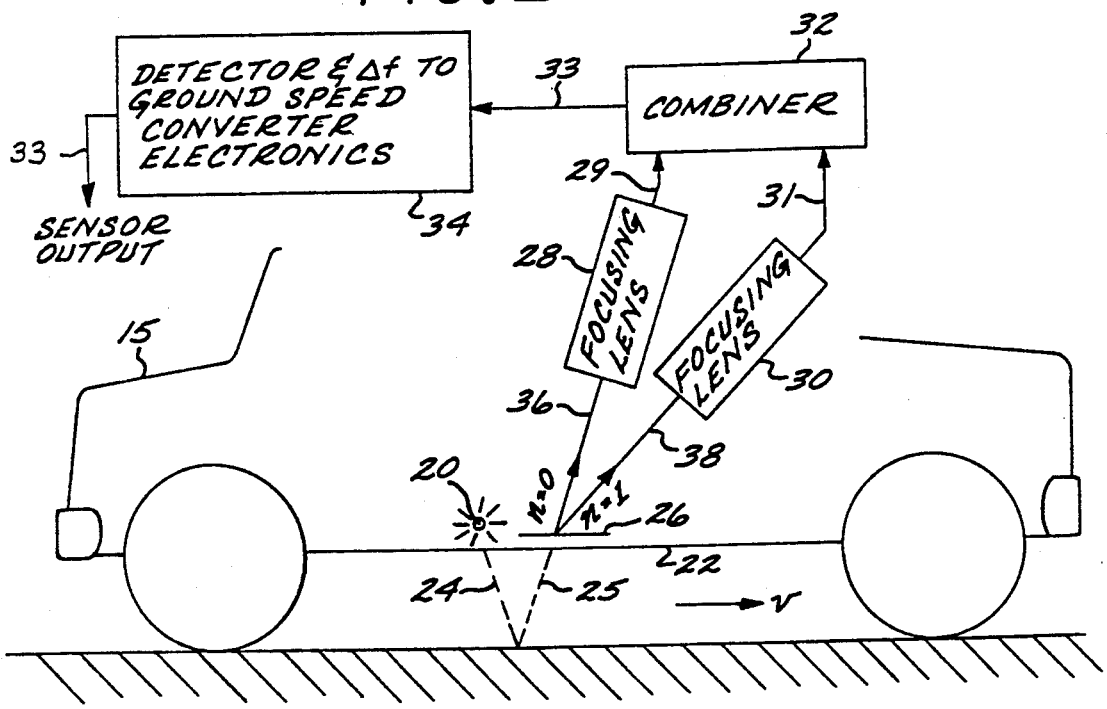
FIG. 2 is a simplified block diagram illustrating a preferred embodiment of a true ground speed sensor embodying the invention.

A simplified block diagram of an apparatus embodying the invention for use in sensing true ground speed of a moving vehicle 15 is illustrated in FIG. 2. A source 20 of electromagnetic energy of wavelength $\lambda$ is mounted adjacent the undercarriage 22 of the vehicle 15, and arranged to transmit a beam 24 toward the ground beneath the undercarriage. A diffraction grating 26 is arranged adjacent the undercarriage 22 and substantially parallel thereto. The sensing apparatus further comprises a zero-th order focusing lens 28, a first order focusing lens 30, electromagnetic transmission lines 29, 31, and 33, combiner 32 and an opto-electric detector and $\Delta f$-to-ground speed converter 34.

The purpose of the respective focussing lens 28 and 30 is to converge the respective beam contributions from many slits at the focal plane of the lens. Focussing lens 28 converges all the zero-th order contributions from the various slits and focussing lens 30 converges all the first order contributions from the various slits.

A beam of electromagnetic radiation of wavelength $\lambda$ is reflected off the ground from the vehicle 15 moving with speed v. The ground acts as an extended source. The reflected radiation (beam 25) illuminates the grating 26 which transmits diffracted beams of order zero to n. Two beams 36 and 38, say of order n=0 and n=1, are passed through the respective focusing lenses, conducted by the respective transmission lines 29 and 31 to the combiner 32 and combined in the combiner 32. The combined energy, wherein the respective beams interfere to produce the beat frequency $\Delta f$, is conducted to the detector 34 by transmission line 33. The detector and electronics 34 converts the beat frequency $\Delta f$ to a sensor signal 35 indicative of the true ground speed of the grating.

The physical origin of $\Delta f$ produced by a moving grating is the Doppler effect. The advantage of the grating 26 is its efficiency, i.e., a large amount of energy is directed in a particular direction and at a single frequency. It is important to note that the beat frequency and, hence, ground speed ($\Delta f = (v/b)$) is independent of the wavelength or intensity of the source 20 or the height of the vehicle from the ground.

An estimate can be made for a given grating spacing b (its slit spacing and slit width) as to what frequencies to expect for a range of vehicle ground speeds. For example, the velocity v might be in the range 0–150 miles per hour, or 0–67 m/sec. So, for $b = 10\mu m$, $\Delta f = 0$–6.7 MHz. For the millimeter wave region $b \approx 1$ cm, $\Delta f = 0$–670 Hz. Detection at these beat frequencies is easily attained.

In one preferred embodiment, the source emits light in the infrared wavelength region so that effective operation can be obtained with some dirt obscuration of the source and grating elements. Preferably the light source and grating are recessed into respective tubular receptacles to lessen the possibility that dirt could obscure the optics of the system. In such a sensor system, the light source 20 could comprise an infrared semiconductor laser operating at 1300 nm, such as the model C86013E, marketed by RCA Electro-optics, 733 Donegal Business Center, Mount Joy, PA 17552. The grating 26 should include a large number of lines, at least several hundred or thousand, since the frequency resolution of the sensor increases with the number of lines. For infrared operation, the grating spacing is preferably in the range of one to five microns. The grating 26 could be an acetate film grating with 2,700 grooves/inch (5 micron spacing), available from Edmond Scientific, 101 E. Gloucester Pike, Barrington, NJ 08007. The focusing lens 28 and 30 could be the lens model PAC010 at the IR wavelength with antireflective coatings at the wavelength of interest, available from Newport Research Corporation, 18235 Mt. Baldy Circle, Fountain Valley, California 92728. The optical fibers 29 and 31 are single mode optical fibers operable at the IR frequency of interest. The optical combiner 32 can be a model SF4-D-1300-B combiner, available from CANSTAR, 3900 Victoria Park Avenue, North York, Ontario, Canada, M2H3H7. The detector circuit and conversion electronics can comprise an Indium Gallium Arsenide photodiode photodetector with a frequency counter circuit. A suitable diode detector is the C30617E detector available from RAC Electro-optics, 733 Donegal Business Center, Mount Joy, PA 17552. A suitable frequency counter can include the frequency-to-voltage converter part LM2907, available from National Semiconductor Corporation, 2900 Semiconductor Drive, Santa Clara, California. The diode detector envelope detects the beat frequency $\Delta f$, not the optical frequency, and produces a voltage output signal. The frequency-to-voltage converter generates an output signal indicative of the beat frequency $\Delta f$. This converter output signal may be applied to an indicator apparatus (e.g., a speedometer indicator on the vehicle dashboard) to indicate the vehicle ground speed to the driver, or to other apparatus utilizing the speed data, such as a cruise control, anti-lock brake system, odometer apparatus, or the like.

One concern is the alignment when the vehicle is tilting from a sharp turn or from braking action. The misalignment would render the instrument useless if the source were collimated with a narrow beam width, since the reflected beam 25 might miss the grating 26 altogether. The sensor system can be designed to accommodate tilt by emitting a diverging beam from the source 20 and increasing the entrance aperture and field of view of the equivalent lens 28 and 30 in FIG. 2.

The purpose of this invention is to provide a measure of true ground speed for moving vehicles. It has the advantage of no moving parts, compactness and can be made rugged.

It is understood that the above-described embodiments are merely illustrative of the possible specific embodiments which may represent principles of the present invention. For example, instead of a laser for the light source, a longer wavelength source such as a millimeter wave transmitter could be use. Other arrangements may readily be devised in accordance with these principles by those skilled in the art without departing from the scope and spirit of the invention.

What is claimed is:

1. A ground speed sensor for moving vehicles, comprising:
a source of electromagnetic energy arranged to generate a beam of energy downwardly toward the ground adjacent the vehicle;
a diffraction grating arranged so that electromagnetic energy reflected from the ground is incident on the grating;
means for combining different orders of the energy diffracted by the grating to develop an energy beat frequency which is dependent on the speed of the grating relative to the ground; and
means responsive to the energy beat frequency to provide a sensor signal indicative of the speed of the vehicle relative to the ground.

2. The sensor of claim 1 wherein said combining means comprises means for combining the zero order and first order diffracted energy beams from said grating, and wherein said beat frequency is the difference between the frequency of the zero order beam and the frequency of the first order diffracted beam.

3. The sensor of claim 1 wherein said source comprises an emitter of energy having a wavelength in the range of 1 micron to 1 centimeter.

4. The sensor of claim 3 wherein said source of electromagnetic energy comprises a source of infrared electromagnetic energy.

5. The sensor of claim 3 wherein said grating is characterized by a grating line spacing on the order of one to five microns.

6. The sensor of claim 2 wherein said grating is characterized by a grating having a number of slits of width b, and wherein the beat frequency is substantially equal to v/b, where v represents the speed of the vehicle relative to the ground.

7. The sensor of claim 1 wherein said source and said grating are arranged adjacent the undercarriage of the vehicle, so that the source directs the electromagnetic energy downwardly toward the ground below the vehicle, and the grating is arranged to intercept energy emitted by the source and reflected by the ground.

8. The sensor of claim 1 wherein said grating is characterized by a plurality of slits, and said combining means comprises lens means for converging diffracted energy from the grating at a focal plane, transmission lines for conducting the diffracted energy from the lens focal plane to a combiner element, the combiner element for combining respective diffracted beams of different order transmitted through said transmission lines so that the respective diffracted beams interfere to produce said beat frequency.

9. The sensor of claim 8 wherein said lens means comprises a first lens for converging the l-th order diffracted beams from the respective slits comprising the grating at the lens focal plane, and a second lens for converging the m-th order diffracted beam from the slits comprising the grating at the lens focal plane.

10. The sensor of claim 9 wherein said transmission lines comprise optical fibers.

11. The sensor of claim 1 wherein said diffraction grating is a transmission grating.

12. A ground speed sensor for moving vehicles, comprising:

a laser mounted on the vehicle and arranged to generate a laser energy beam downwardly toward the ground adjacent the vehicle;

a diffraction grating mounted on the vehicle and arranged so that laser energy reflected from the ground is incident on the grating, said grating comprising a plurality of grating slits arranged transversely to the direction of movement of the vehicle;

means for combining the energy diffracted by the grating to develop an energy interference beat frequency which is dependent on the speed of the grating relative to the ground, said means comprising a first lens means for converging l-th order diffracted beams from the respective grating slits at a focal plane, second lens means for converging m-th order diffracted beams from the respective grating slits at a second lens focal plane, an optical combiner, and optical fiber transmission lines for conducting the respective l-th and m-th order converged beams to said optical combiner; and means responsive to the energy beat frequency to provide a sensor signal indicative of the speed of the vehicle relative to the ground.

13. The sensor of claim 12 wherein said combining means comprises means for combining the zero order and first order diffracted energy beams from said grating, and wherein said beat frequency is the difference between the frequency of the zero order beam and the frequency of the first order diffracted beam.

14. The sensor of claim 12 wherein said laser comprises an infrared laser.

15. The sensor of claim 14 wherein said grating is characterized by a grating line spacing on the order of one to five microns.

16. The sensor of claim 13 wherein said grating is characterized by a grating having a number of slits of width b, and wherein the beat frequency is substantially equal to v/b, where v represents the speed of the vehicle relative to the ground.

17. The sensor of claim 12 further characterized in that said grating is a transmission grating.

* * * * *